US006882439B2

United States Patent
Ishijima

(10) Patent No.: US 6,882,439 B2
(45) Date of Patent: *Apr. 19, 2005

(54) PRINTING SERVICE METHOD, SYSTEM, AND PRINTER

(75) Inventor: Hiroyasu Ishijima, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 775 days.

This patent is subject to a terminal disclaimer.

(21) Appl. No.: 09/799,085

(22) Filed: Mar. 6, 2001

(65) Prior Publication Data

US 2002/0057451 A1 May 16, 2002

(30) Foreign Application Priority Data

Oct. 26, 2000 (JP) ........................................ 2000-326812

(51) Int. Cl.$^7$ .............................................. G06K 15/00
(52) U.S. Cl. ...................................... 358/1.15; 358/1.1
(58) Field of Search ................................ 358/1.1, 1.13, 358/1.15, 1.18, 402, 403; 705/14, 26; 709/200, 203

(56) References Cited

U.S. PATENT DOCUMENTS 5,781,894 A * 7/1998 Petrecca et al. .............. 705/14

2004/0039641 A1 * 2/2004 Satomi et al. ................ 705/14

FOREIGN PATENT DOCUMENTS

| JP | 62-118362 | 5/1987 |
| JP | 1-195753 | 8/1989 |
| JP | 8-256256 | 10/1996 |
| JP | 9-90832 | 4/1997 |
| JP | 11-192760 | 7/1999 |

* cited by examiner

Primary Examiner—Arthur G. Evans
(74) Attorney, Agent, or Firm—Staas & Halsey LLP

(57) ABSTRACT

The Disclosure relates to a printing service method for discounting services by printing with advertisements and realizes various discount services. The present invention comprises: a printing step for sending printing management information along with the user ID to the server 4 through the network 3 when the user prints with advertisements with the user's printing device 2, and storing that information as an advertisement usage record for each user ID; a step for referencing the user's advertisement usage record, for least one service, selected by the user from among a plurality of services relating to the printing device that used the advertisement printing record, determining whether to authorize the discount for the selected service, and updating the advertisement usage record of the abovementioned user to perform the authorized discount service. A variety of discount services can be realized because the print operation with advertisements is managed by the server and the user can use the usage records.

18 Claims, 23 Drawing Sheets

FIG. 2(A)

| User ID | User name | Password | Address | Phone number | Accumulated points |
|---|---|---|---|---|---|
| UID00920571 | Fujitsu Taro | fujitsu571 | Tokyo Inagi ~ | XXX-XXX-XXXX | 500 |
| UID00920572 | Fujitsu Hanako | abcdef | Tokyo Bunkyo ~ | XX-XXXX-XXXX | 200 |
| UID00920573 | F limited P division | fprinter123 | Tokyo Inagi ~ | XXX-XXX-XXXX | 15000 |
| UID00920574 | A limited A division | asoumubu%%% | Tokyo Shibuya ~ | XX-XXXX-XXXX | 2000 |
| UID00920575 | B limited B division | bkoubai!#$ | Tokyo Mitaka ~ | XXX-XXX-XXXX | 1000 |
| UID00920576 | C limited C division | choumu098 | Tokyo Kawasaki ~ | XXX-XXXX-XXXX | 10000 |
| ... | | | | | |

FIG. 2(B)

| Image data name | Advertiser | Advertiser name | Image format | Monochro/color | Resolution[dpi] | Width[dot] | Height[dot] | Unit point |
|---|---|---|---|---|---|---|---|---|
| Data A1 | A | Product A1 | JPG | Monochro | 600 | 3900 | 520 | 2 |
| Data A2 | A | Product A2 | TIFF | Color | 600 | 3900 | 520 | 8 |
| Data A3 | A | Service A3 | JPG | Color | 150 | 975 | 130 | 2 |
| Data B1 | B | Product B1 | TIFF | Color | 300 | 1950 | 260 | 4 |
| Data B2 | B | Product B2 | TIFF | Monochro | 300 | 1950 | 260 | 1 |
| Data B3 | B | Service B3 | TIFF | Color | 300 | 1950 | 260 | 4 |
| ... | | | | | | | | |

FIG. 2(C)

| Pointer | Image data name | Accumulated number of reference |
|---|---|---|
| | Data A1 | 1050 |
| | Data A2 | 1050 |
| | Data A3 | 1050 |
| ↑ | Data B1 | 1050 |
| | Data B2 | 1049 |
| | Data B3 | 1049 |
| | ... | ... |

FIG. 5(A)

| Pointer | Advertiser | Advertisement name | Advertisement image data | Accumulated number of reference |
|---|---|---|---|---|
| | A | Product A1 | Data A1 | 1050 |
| ↑ | A | Product A2 | Data A2 | 1050 |
| | A | Service A3 | Data A3 | 1050 |
| | B | Product B1 | Data B1 | 1050 |
| | B | Product B2 | Data B2 | 1049 |
| | B | Service B3 | Data B3 | 1049 |
| | .. | .. | .. | .. |

FIG. 5(B)

| Pointer | Advertiser | Advertisement name | Advertisement image data | Accumulated number of reference | Reference limit | Print stop flag |
|---|---|---|---|---|---|---|
| | A | Product A1 | Data A1 | 1003 | 2000 | Continue |
| ↑ | A | Product A2 | Data A2 | 1000 | 1000 | Stop |
| | A | Service A3 | Data A3 | 996 | 1000 | Continue |
| | B | Product B1 | Data B1 | 1002 | 2000 | Continue |
| | B | Product B2 | Data B2 | 998 | 2000 | Continue |
| | B | Service B3 | Data B3 | 1004 | 1000 | Stop |
| | .. | .. | .. | .. | .. | .. |

FIG. 5(C)

| Pointer | Advertiser | Advertisement name | Advertisement image data | Accumulated number of reference | Valid period | Print stop flag |
|---|---|---|---|---|---|---|
| | A | Product A1 | Data A1 | 1003 | 2000/6/30 | Continue |
| ↑ | A | Product A2 | Data A2 | 1004 | 2000/6/20 | Stop |
| | A | Service A3 | Data A3 | 996 | 2000/7/8 | Continue |
| | B | Product B1 | Data B1 | 1002 | 2000/12/31 | Continue |
| | B | Product B2 | Data B2 | 998 | 2001/1/3 | Continue |
| | B | Service B3 | Data B3 | 1004 | 2000/8/31 | Continue |
| | .. | .. | .. | .. | .. | .. |

FIG. 5(D)

| Pointer | Advertiser | Advertisement name | Advertisement image data | Accumulated number of reference | Coeficiency of appearance |
|---|---|---|---|---|---|
| | A | Product A1 | Data A1 | 1012 | 1 |
| ↑ | A | Product A2 | Data A2 | 1902 | 2 |
| | A | Service A3 | Data A3 | 2510 | 2.5 |
| | B | Product B1 | Data B1 | 1008 | 1 |
| | B | Product B2 | Data B2 | 998 | 1 |
| | B | Service B3 | Data B3 | 1212 | 1.2 |
| | ... | | | | |

FIG. 5(E)

| Pointer | Advertiser | Advertisement name | Advertisement image data | Accumulated number of reference | Coeficiency of appearance | Object customer |
|---|---|---|---|---|---|---|
| | A | Product A1 | Data A1 | 1012 | 1 | 20~40 women |
| ↑ | A | Product A2 | Data A2 | 1902 | 2 | 30~40 men |
| | A | Service A3 | Data A3 | 2510 | 2.5 | 10~20 women |
| | B | Product B1 | Data B1 | 1008 | 1 | No limited |
| | B | Product B2 | Data B2 | 998 | 1 | 50~60 men |
| | B | Service B3 | Data B3 | 1212 | 1.2 | 60~ |
| | ... | | | | | ... |

PRINTING SERVICE METHOD, SYSTEM, AND PRINTER

BACKGROUND OF THE INVENTION

1. Field of the Invention

The present invention relates to a printing service method, system therefor, and printer, for providing a discount service by printing advertisements on printed matter, and more particularly to a printing service method, system therefor, and printer that expand a fee discount service for individuals, to create a fee discount service for companies and thereby improve user convenience.

2. Description of the Related Art

As uses of printed matter have become more diversified, so too has it become common for the needs of printed matter to extend beyond the subject matter itself. There is also a need for printed matter to be provided inexpensively. For this reason, a service method for printing advertisements on printed matter and providing a discount service for users is being used in the field of photocopiers.

This system adds an advertising print function to a photocopier, prints advertisements in the margins of printed matter during copying, and discounts the copying fees accordingly. This discount fee is made possible by charging the sum discounted to the advertisers.

The fee discount method by printing advertisements with the photocopier itself is disclosed in the Japanese Patent Laid-open Application No. 62-118362, and Japanese Patent Laid-open Application No. 9-90832, for example. The changing of advertisement information in the photocopiers through a network is disclosed in the Japanese Patent Laid-open Application No. 8-256256 and Japanese Patent Laid-open Application No. 11-192760, for example. Furthermore, the inclusion of an advertising print function in a facsimile machine in order to discount the facsimile transmission fee is disclosed in the Japanese Patent Laid-open Application No. 1-195753.

All instances of the prior art hypothesize a copying service for individuals. In other words, these are service systems wherein the print-fee is discounted whenever the advertisements are printed, or the number of pages with printed advertisements are counted and discounted together at the payment stage.

Meanwhile, in the office environment for small and medium enterprises to large companies, copiers output a very large number of copies and printers output a very large number of pages, but there is no service for discounting the fees for using those devices.

For this reason, while there are merits to a discount service in agreements for renting a number of machines, a problem is that this cannot be used for other services (office supplies, maintenance services, etc.) in unit rentals (for example, only the number of pages used). Another problem is that it is not possible to receive such a discount service for products that are purchased, such as printers.

SUMMARY OF THE INVENTION

Consequently, it is an object of the present invention to provide a printing usage service method, system therefor, and printer that can enable a user to receive a preferred discount service through the printing of advertisements.

It is another object of the present invention to provide a printing usage service method, system therefor, and printer whereby a user selects the discount service by using discount points for the printing of advertisements.

In order to achieve these objects, a printing service method of the present invention comprises: a step of printing with an advertisement with a printing device and transferring printing management information and user ID according to said print to a server through a network to store as an advertisement usage record for each user ID; a step of selecting at least one service from among a plurality of services relating to the printing device that used the advertisement usage record and referring the user's advertisement usage record to determine whether discounting of the selected service is authorized; a step of updating the user's advertisement usage record to execute the authorized discount service.

In the present invention, printing management information is transferred from the printing device to the server and the server manages advertisement usage records each time advertisements are printed with the printing device. Then, the server references the advertisement usage records and authorizes the service relating to the printing device selected by the user. For this reason, because the server manages this system with the advertisement usage records, the user can select a plurality of services provided by the server and receive discounted service Also, because the server manages the printing of advertisements, the process for billing the advertiser also becomes easy.

Also, in the present invention, the printing step preferably comprises: a step of sending the printing management information to the server with said printer; a step of calculating the advertisement usage records for the user from the printing management information, compiling the advertisement usage records, and transferring the advertisement information to the printing device; and a step of combining the advertisement images with the printing information to be printed based on the advertisement information from the server and printing out by the printing device. Thus, after the advertisement usage records have been compiled, the printing of advertisements is executed, meaning that it is possible to accurately manage the advertisement usage records with the server.

Furthermore, in the present invention, the transfer step preferably comprises: a step for receiving the printing management information and printing information from the user terminal using the printing device; and a step for spooling the printing information and sending the printing management information to the server. It thereby becomes possible to automatically manage the advertisement usage records for the printing requests from a user terminal.

Furthermore, in the present invention, the transfer step preferably comprises a step for transferring the advertisement image to the printing device. The advertisement image can thus be managed by the server, which can perform basic management of the advertisement printing service. In other words, advertisement images can then easily be added, updated, and deleted, and so on. Also, it is not necessary to include extra functions in the printing device and it is possible to construct a system that is easily introduced by the users.

Furthermore, in the present invention, the abovementioned transmission step preferably comprises a step for transferring the name of the advertisement image to the printing device; and the print out step comprises a step for selecting the advertisement image with the advertisement image name from among a plurality of advertisement images stored in the printing device. It thereby becomes possible to omit the transfer of the advertisement images, to reduce the waiting time of the printing device, and to perform high-speed advertisement printing.

Furthermore, in the present invention, the updating step preferably comprises a step for confirming the password input by the user. It thereby becomes possible to reject fraudulent discount requests.

Furthermore, in the present invention, the step for transferring advertisement information preferably comprises a step for calculating the frequency of use of the advertisement image from the printing management information of the user, and calculating the abovementioned advertisement usage record. It thereby becomes possible to match the advertisement usage records to the actual conditions of the user's advertisement printing.

Furthermore, in the present invention, the step for transferring advertisement information preferably comprises a step for selecting at least one item of advertisement information from among a plurality of items of advertisement information stored in the server. It thereby becomes possible to realize a service for printing a plurality of items of advertisement information.

BRIEF DESCRIPTION OF THE DRAWINGS

FIGS. 2(A), 2(B) and 2(C) are drawings of the configuration of the database in FIG. 1;

FIGS. 5(A), 5(B), 5(C), 5(D) and 5(E) are drawings to explain the process for billing advertisement costs in FIG. 1;

DESCRIPTION OF THE PREFERRED EMBODIMENTS

The preferred embodiments of the present invention are explained below in the following order: printing service system, printing phase, discount usage phase, and other embodiments.

(Printing service system)

Figure 1:
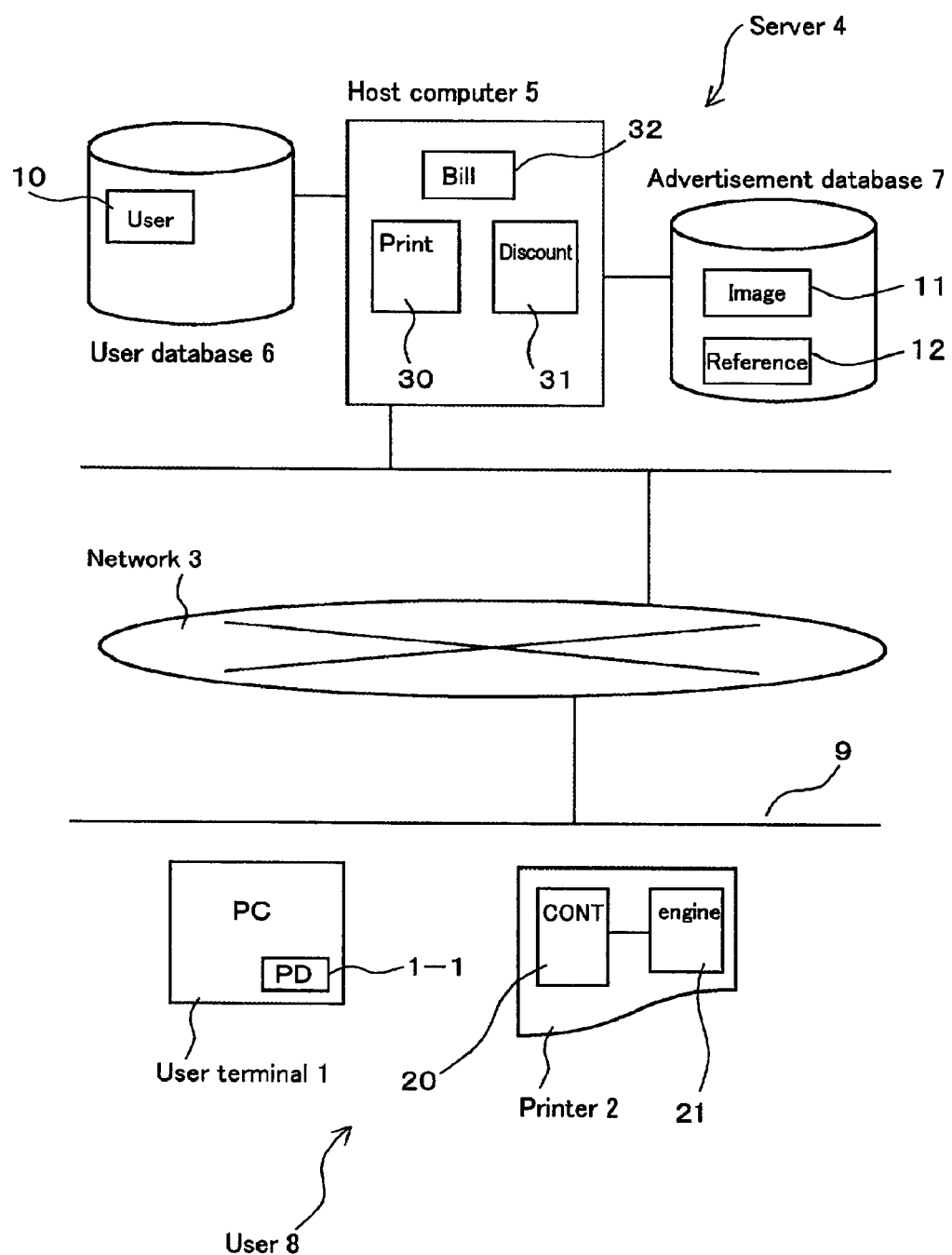
FIG. 1 is a drawing of the configuration of the system in a first embodiment of the present invention.
Figure 3:
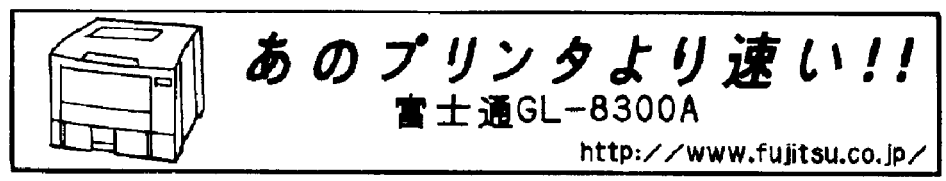
FIG. 3 is a drawing to explain the advertisement image in FIG. 1.
Figure 4:
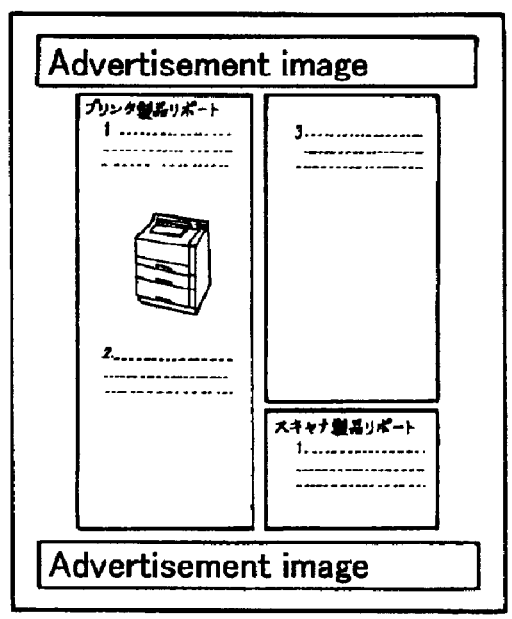
FIG. 4 is a drawing to explain printing with advertisements in FIG. 1.

FIG. 1 is a drawing of the configuration of the system relating to one embodiment of the present invention. FIG. 2 is a drawing to explain the data table thereof. FIG. 3 is a drawing to explain the advertisement image thereof. FIG. 4 is a drawing to explain printing with advertisements thereby. FIG. 5 is a drawing to explain the process for billing advertisement costs.

FIG. 1 is a block diagram of advertisement printing with a printer shown as an example of the printing service system. As shown in FIG. 1, the printing service company owns a server 4. The server 4 comprises a host computer 5, a user database 6, and an advertisement information database 7. For example, the printing service company is a maintenance service company for the printer 2.

Meanwhile, the user system 8 comprises one or a plurality of user terminals (for example, personal computers) 1, one or a plurality of printers 2, and a local area network (LAN) 9 connecting these.

The server 4 and user system 8 are connected by a network 3 such as the Internet. The printer 2 comprises a control unit 20 and a print engine 21 and, for example, is composed of an electro-photographic printer. The printer 2 prints out indicated data according to instructions from the user terminal 1.

A user data table 10 shown in FIG. 2 (A) is established in the user database 6 connected to the host computer 5. Also, an image data table 11 shown in FIG. 2 (B) and reference count table 12 are established in the advertisement information database 7. General-purpose relational databases or object oriented databases, for commercial use, can be used as the databases of these systems. For example, it is possible to use Oracle 8 from Oracle, MySQL, DBPro, Fujitsu SymfoWare, or the free software PostgreSQL.

The user data table 10 shown in FIG. 2 (A) contains the user ID, user name, password, and current number of points accumulated. The data table 10 may also contain general information such as addresses and phone numbers. The advertisement image data table 11 shown in FIG. 2 (B) contains the advertisement image data name, advertiser, advertisement name, image format, monochrome/color classification, resolution, width, height, and unit points etc. The advertisement image data are stored in the advertisement information database 7 as advertisement image data received in advance from the advertiser. FIG. 3 shows an example of an advertisement image.

The reference count table 12 shown in FIG. 2 (C) contains the pointer to the advertisement image data to be referenced next, advertisement image data name, and the number of references accumulated. Each of the table fields is appropriately connected, selected, and used according to the functions of a relational database or object-oriented database.

Back in FIG. 1, the host computer 5 carries out the printing processing 30, discount usage processing 31, and advertisement fee billing processing 32. In other words, this system comprises three phases. These are the printing phase, discount usage phase, and fee billing phase.

First, the printing phase is explained using FIG. 1.

(1) The user decides whether to print with advertisements, when printing to the printer 2 from the personal computer 1 that is a user terminal. The operations shown here are for the case of performing printing with advertisements. In the case of printing with advertisements, the user uses the printer driver 1—1 to indicate printing with advertisements. The printer driver 1—1 sends the data to be printed and management information to the printer 2. The management information includes the user ID and information such as the number of pages printed.

(2) In the printer 2 with the advertising print function, the control unit 20 separates the printing data and management information. The printing data are spooled (temporarily saved) within the printer. The control unit 20 also calculates information such as the position of the blank spaces and adds this to the management information.

(3) The printer 2 transfers the management information to the host computer 5 through the network 3.

(4) The host computer 5 receives the management information from the printer 2, executes the printing processing 30, and separates the user information (user ID etc.) and the advertisement printing control information. Based on the advertisement printing control information, the host computer 5 searches for and fetches the advertisement information (image, text), obtained in advance from the advertiser, from the advertisement information database 7. The advertisement information obtained is sent to the printer 2 through the network 3.

(5) The advertisement information obtained from the host computer 5 is synthesized in the printer 2 and printed as printing with advertisements, as shown in FIG. 4. The printing with advertisements in FIG. 4 is an example wherein the print area is uniformly reduced, blank space for inserting advertisements is created, and advertisement images are inserted. Another example may use the known technology disclosed in Japanese Patent Laid-open Application No. 8-256256 and search for blank spaces in the printed data, request advertisement images with matching areas, and automatically establish a plurality of advertisements. Like the example in FIG. 3, this advertisement image is image data of 3900×520 pixels, for example. In 600 dpi printing, this corresponds to a size of 165 mm×22 mm. This advertisement image data is received in advance from the advertiser and stored in the advertisement image data table 11. A general format is used for the image data, such as TIFF or JPEG, and must be a format such that the printing device can synthesize the image.

(6) Meanwhile, with the user information separated in (4), the discount points information as discussed below is calculated and stored in the user data table 10, for that user ID, based on the number of pages printed and the size of the advertisements. Also, the cumulative reference count in the reference count table 12 is updated.

The discount usage phase (use of discount service) is explained next using FIG. 1.

(10) The use of discount service is determined from the user terminal 1. The discount service can be selected from a plurality of types such as maintenance of the printer 2, reduction of repair costs, toner discounts, or cartridge discounts.

(11) Along with the user ID information, the selected information is transferred to the host computer 5 through the network 3.

(12) When the host computer 5 receives a discount request, the host computer executes the discount processing 31. In other words, the host computer 5 refers to the discount points accumulated for the user ID in the user data table 10. In the case where the customer discount request is in keeping with the accumulated discount points, the customer discount request is executed. As a result of executing the discount request, the customer's discount points are "consumed." In other words, the total number of points is reduced by just a prescribed number of points and the user data table 10 is updated. In the case where the discount points do not permit the customer discount request, a message to the effect that "the request cannot be made" is sent to the user terminal 1.

(13) This authorized discount request is transferred through the network 3 to customer service staff and support staff, not shown. The customer service staff and support staff provide the actual service to the user.

The following method is used as the abovementioned method for calculating discount points.

(A-1) The sizes of the advertisement images are made uniform and one advertisement per page is inserted; the summation of the points is consistently one unit point per page.

(A-2) The sizes of the advertisement images are made uniform and a number n (n>1) of advertisements are inserted per single page. In the case where n advertisements are inserted, this is n unit points. Also, the number of advertisements inserted can be specified at the time of the print command in the printer driver.

(A-3) The sizes of the advertisement images are stored in the advertisement image data table 11 along with the image data. There is one unit point per unit area and n unit points in the case of inserting an advertisement of n unit area.

(A-4) When the printer 2 is a color printer, the user can select between monochrome and color in all of the above cases. When color advertisements are inserted, the unit points are a higher number of points (usually 2 to 4 times the number, for example).

The above cases may be calculated individually or in combination.

The points generated by this advertisement printing are stored in the user data table 10 in the database 6. In other words, according to the abovementioned (A-1) through (A-4), the number of pages printed or the number of advertisement images is multiplied by the unit points in the advertisement image data table 11 and the customer information in the user data table 10 is added to and updated.

Meanwhile, when the user receives the discount service, "the current cumulative points" are appropriately consumed, reduced, and updated.

The phase of billing the advertisement costs to the advertiser is explained next using FIG. 5. The advertisement costs are then billed to the advertiser based on the reference count data table 12. In order to include advertisements in the printing and charge the advertisement fees to the advertiser, a table including the advertiser, advertisement name, advertisement image data, and cumulative reference count is generated from the image data table 11 and the reference count table 12 using the image data file name as the key in the billing process 32. These advertisement image data are typical advertising material, such as images of the advertisers' products, copy text, URLs, and prices, and are stored as an image.

The advertisement costs billed to the advertiser are calculated as follows. The service provider establishes the unit price per advertisement with the advertiser in advance. The number of references to the advertisement is stored in the reference count data table 12. Periodically or at agreed unit intervals, the total advertising costs are calculated by multiplying the unit price per advertisement by the reference count and then billed to the advertiser.

The method for charging the advertiser and an example of the reference count data table 12 are explained using FIG. 2. In the example in FIG. 5 (A), the cumulative reference count is increased by the number of advertisements inserted whenever the advertisement printing user (with an ID) prints material with advertisements. For example, when the user prints one page with advertisement printing, the advertisement for the product B2 at the pointer position is inserted in that printed matter. The cumulative reference count is incremented from [1049] to [1050]. Also, the pointer position is moved from the product B2 to the position of the service B3. Based on the cumulative reference count, the advertisement fee is billed to the advertiser. The amount billed to the advertiser is the cumulative reference count times the unit points times the point unit cost.

Otherwise, a set fee may be paid in advance as the advertisement fee and when a cumulative reference count is exceeded, the advertisements are no longer run. In this case, the reference count table 12 further includes a run stoppage flag as in FIG. 5 (B).

Otherwise, a set fee may be paid in advance as the advertisement fee and when the expiration date is passed, the advertisements are no longer run. The reference count table 12 in this case further includes an expiration date as in FIG. 5 (C). For example, when the date of a reference is [Jun. 21, 2000], the advertisement data for A company's product A2 is not transmitted in the process shown in FIG. 5 (C).

Also, as in FIG. 5 (D), the reference count data table 12 may include an advertisement occurrence coefficient. As the occurrence coefficient, the number of times the advertisement for a product A1, product B2, service A3, product B1, and so forth is selected as an image is generated as a quasi-random number such as 1.0, 2.0, 2.5, 1.0, and so on, respectively. Because the cumulative reference count is higher when the occurrence coefficient is higher, higher advertisement fees can be charged.

Furthermore, because there is specific customer information for individual user providers, it is possible to send images to selective clients who will yield better advertising results. As shown in FIG. 5 (E), for company users, the customers who will receive the advertisements are added to the data table elements; this makes it possible to selectively send advertisements for information technology products, for example, to company users in the IT field.

The advertisement information sent to the abovementioned printer 2 may be downloaded in a batch to the printer 2 in advance. This is expected to reduce the printing time by the time necessary for data transfer. The method for synthesizing the advertisement information is a conventional known method such as finding blank spaces and reducing the text.

In determining the billing of discount points, it is also possible to use known methods or combinations thereof such as making the determination according to the area, number of advertisements, or weight.

Furthermore it is also possible to have a password for each ID of the abovementioned services. In the discount usage phase, it is possible to prevent another person from fraudulently using the discount service because the password is input for that ID when requesting this service. In so doing, if a password is established for each ID, detailed administration of the billing for each department in the company can be performed.

In the embodiment discussed above, the actual service can be selected from among a plurality of services, in addition to discounting the bills, such as discounting paper fees, ink and toner fees, cartridge fees, discounting maintenance fees, and appropriations. The number of discount points used is determined by the service requested by the user. In effect, the services may be worth the same or different numbers of points. An outline of the system network configuration is shown. In this example, the system uses http (hypertext transfer protocol) for sending and receiving user information and advertisement image data between the printer and the server.

(Printing phase)

The protocol used by the network will now first be explained. Hypertext transfer protocol is one of the most widely used Internet protocols because of the expansion of the World Wide Web over the Internet. Generally, networks within companies are separated by a mechanism such as a firewall from the external Internet environment for reasons of security. For this reason, access from the internal company network to the external Internet or in the opposite direction is normally not allowed with many Internet protocols.

On the other hand, in hypertext transfer protocol, a mechanism that can be used safely through the firewall is used by many companies. In many respects this is because of the diffusion of the World Wide Web. For this reason, it is very convenient to use http as the protocol at this time.

The abovementioned printing phase is explained in detail using FIGS. 6 through 11.

Figure 6:
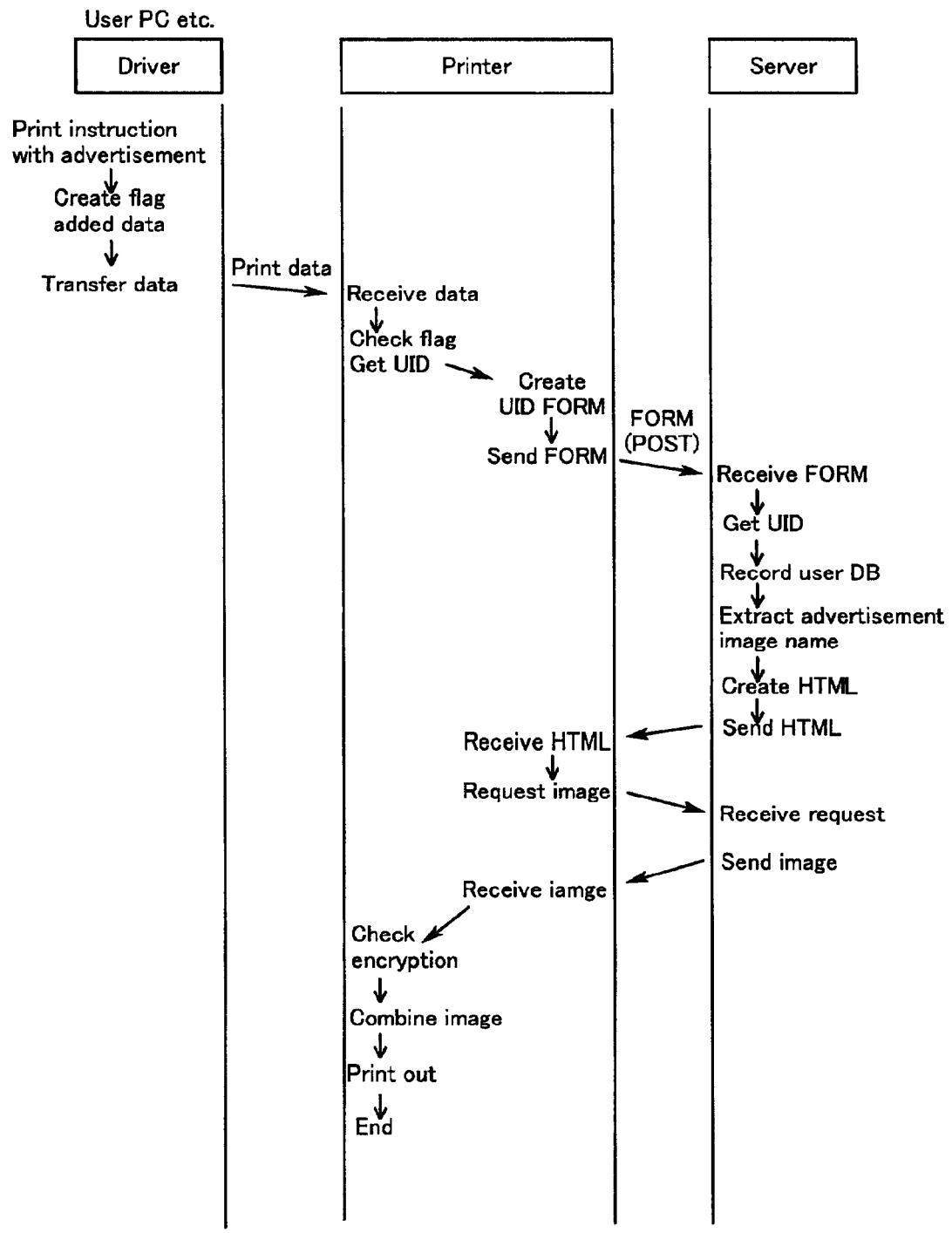
FIG. 6 is a drawing to explain the sequence of the printing phase in FIG. 1.
Figure 7:
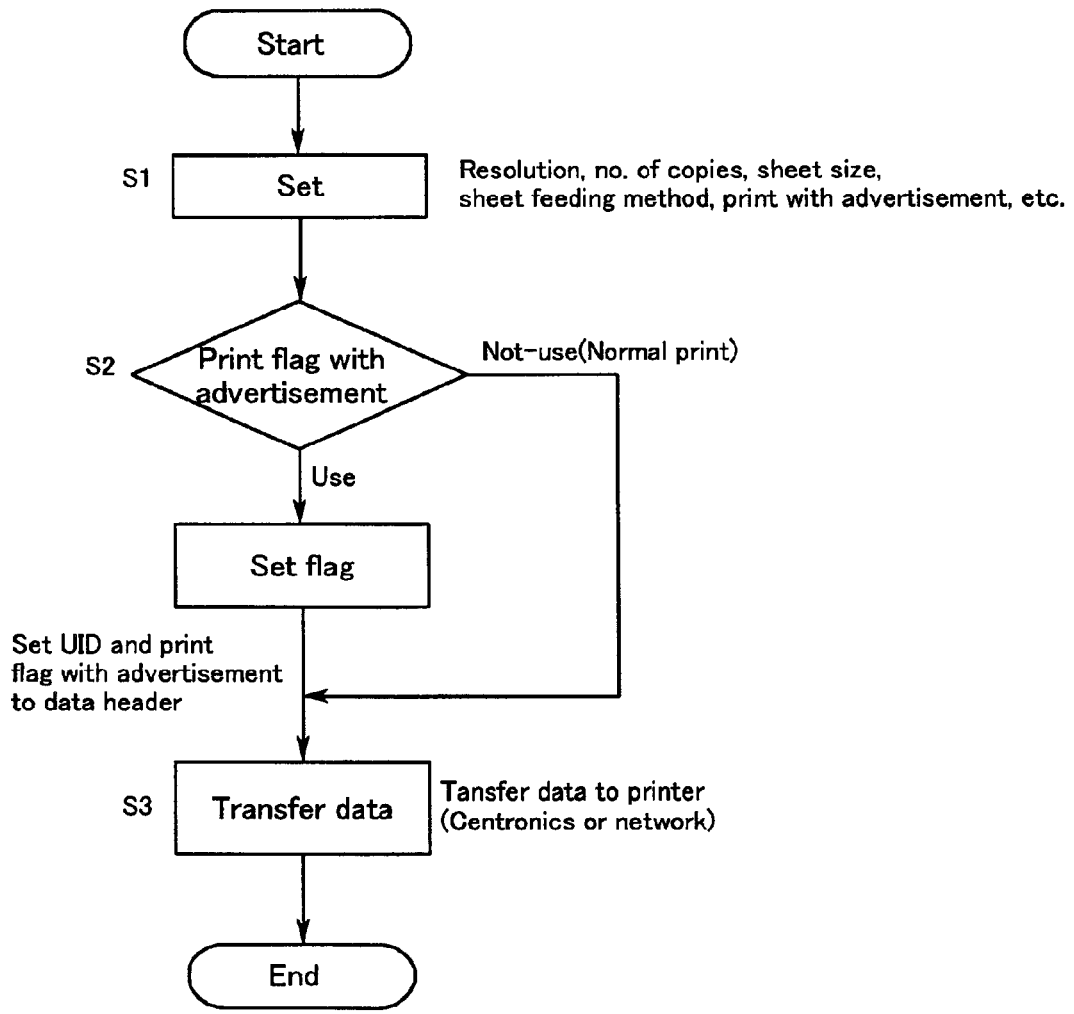
FIG. 7 is a flowchart of the processing by the print driver in the printing phase in FIG. 6.
Figure 8:
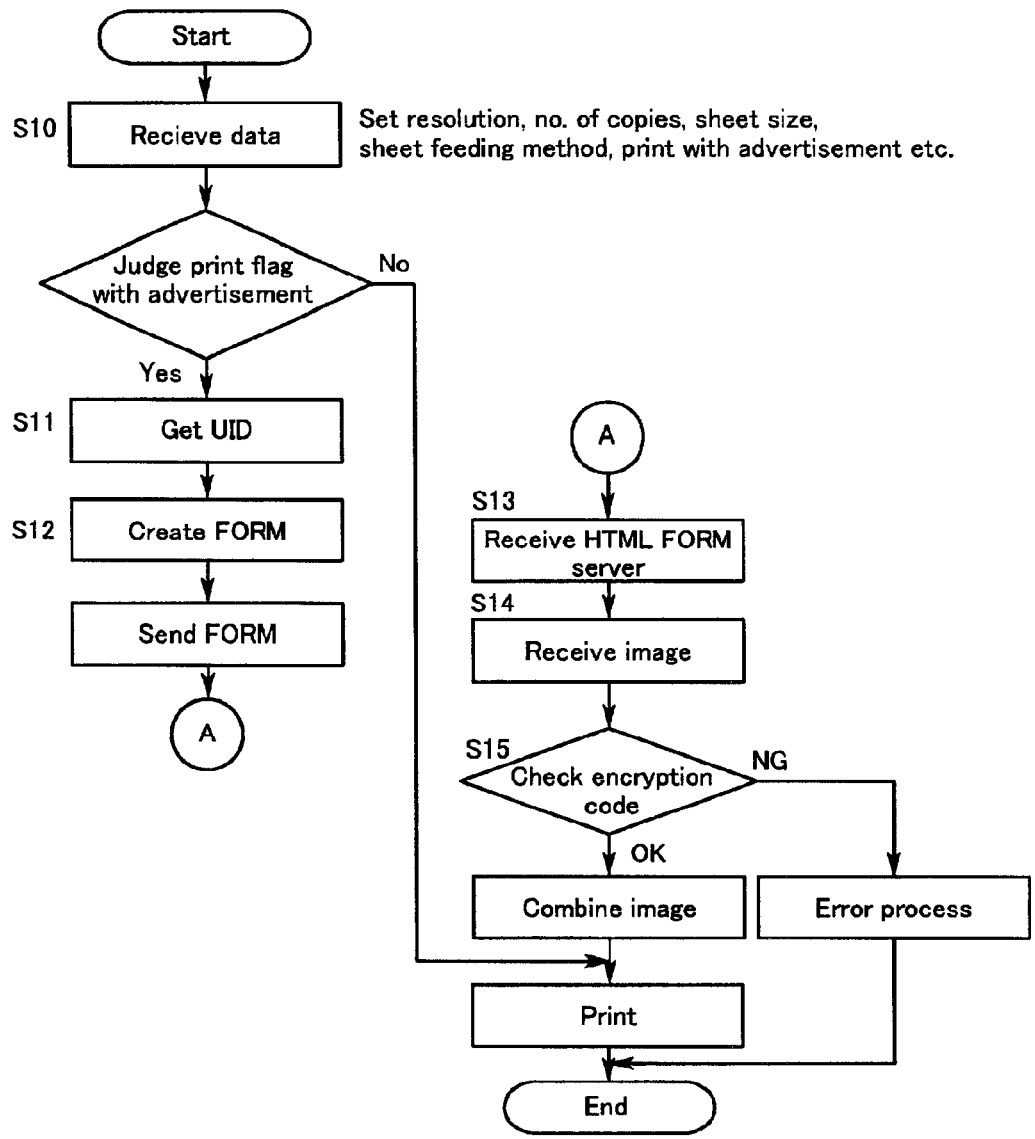
FIG. 8 is a flowchart of the processing by the printer in the printing phase in FIG. 6.
Figure 9:
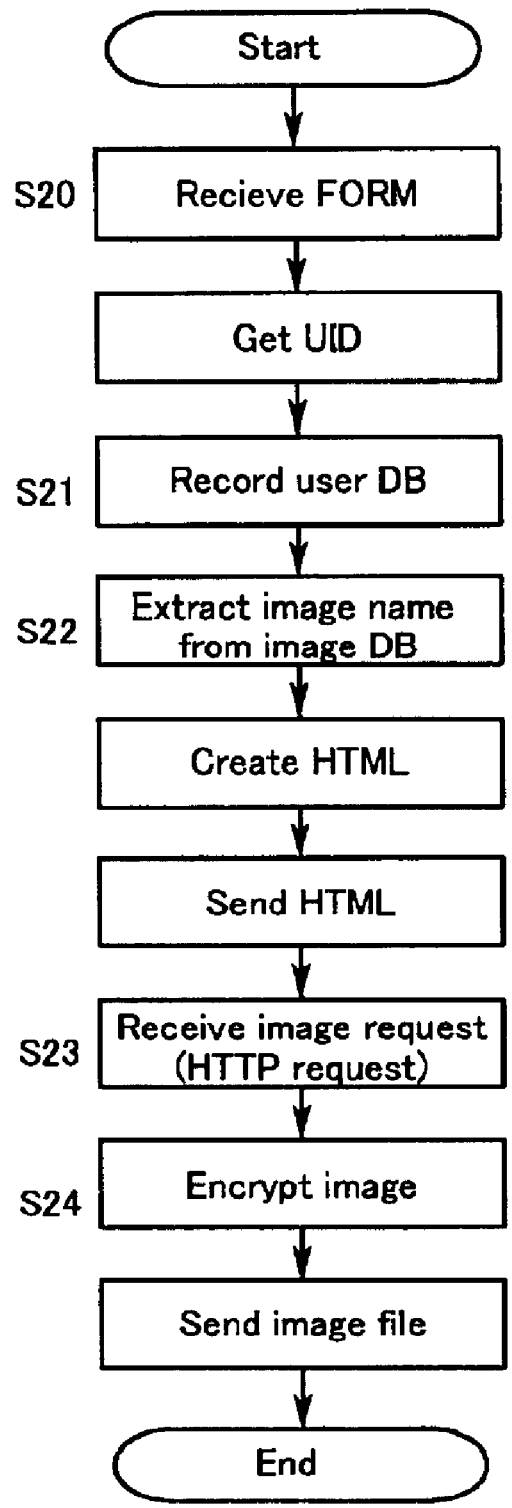
FIG. 9 is a flowchart of the processing by the server in the printing phase in FIG. 6.
Figure 10A:
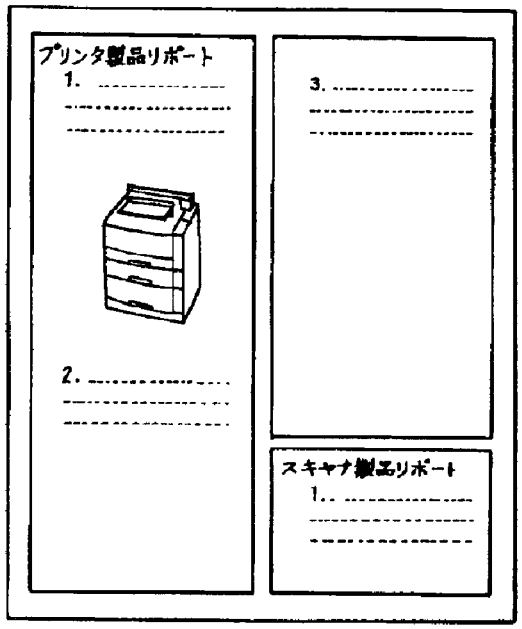
FIGS. 10(A) and 10(B) are drawings to explain printing with advertisements in the printing phase in FIG. 6.
Figure 10B:
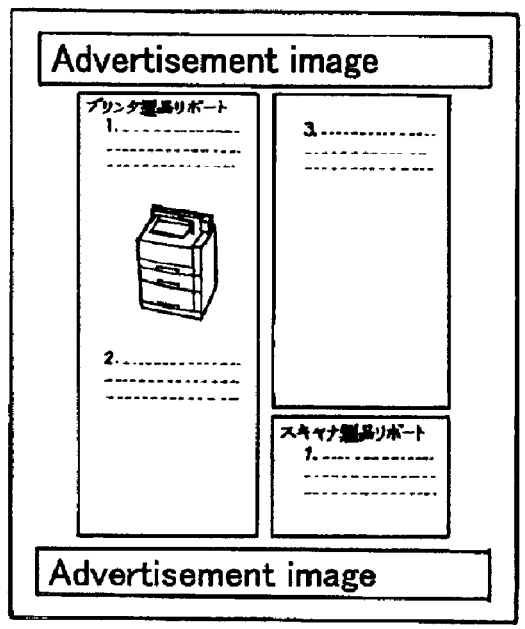
Figure 11:
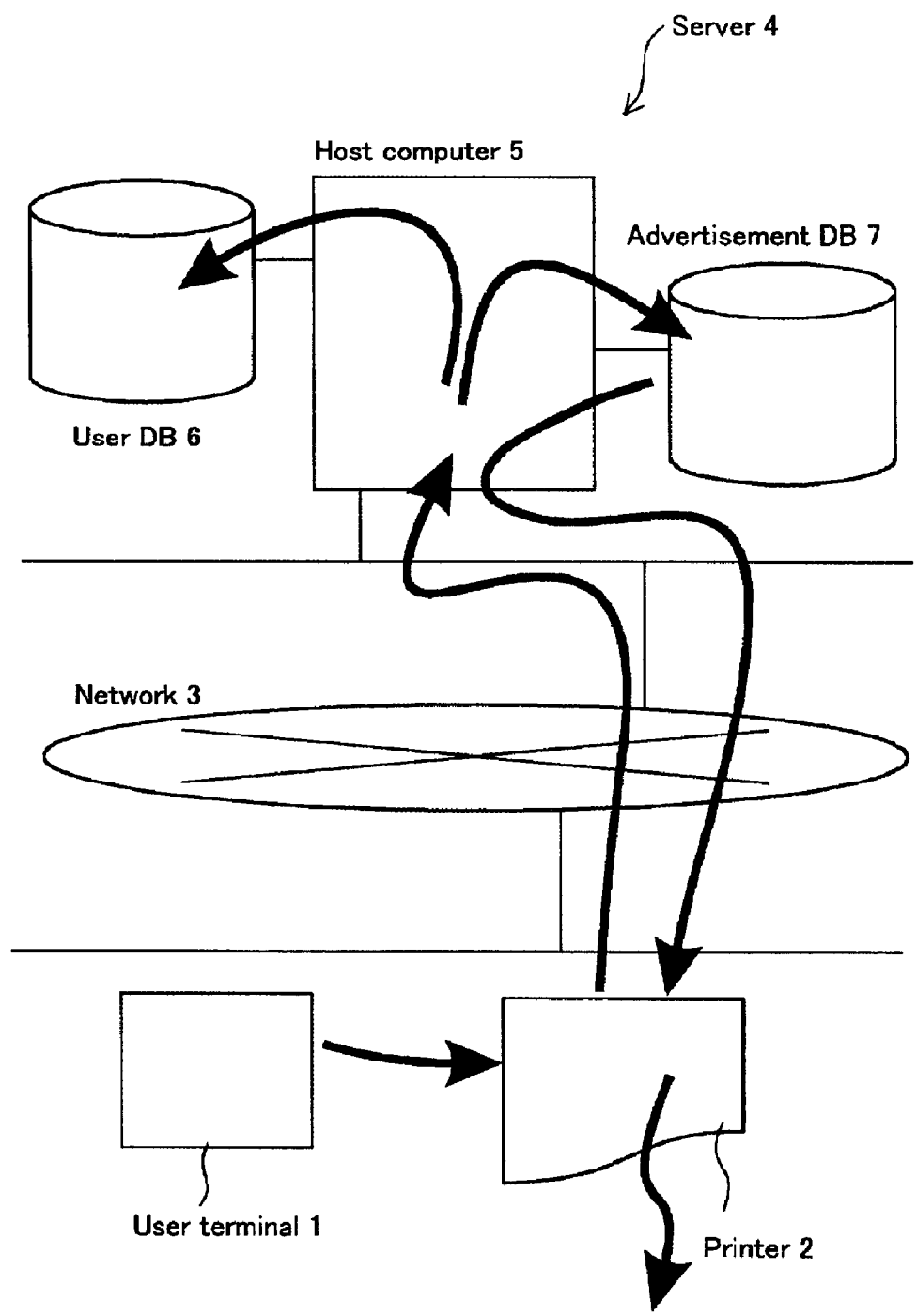
FIG. 11 is a drawing to explain the operations in the printing phase in FIG. 6.

FIG. 6 is a drawing to explain the process flow of the system during the printing of advertisements; FIG. 7 is a flowchart of the processing by the printer driver in the user terminal 1; FIG. 8 is a flowchart of the processing by the printer 2; FIG. 9 is a flowchart of the processing by the server 4; FIG. 10 is a drawing to explain printing with advertisements; and FIG. 11 is a drawing to explain the advertisement printing phase.

The printing phase is explained according to FIG. 6 with reference to FIGS. 7 through 9.

(1) In the case of performing printing with advertisements as shown in FIGS. 6 and 7, "printing with advertisements" is specified with the setting of the driver 1-1 of the user's personal computer 1 (S1). The printer driver 1-1 refers to the printing with advertisements flag and incorporates data including the printing with advertisements flag and the user ID (UID), in the header portion (header portion) of the (print data) (S2). This print data is sent to the printer device 2 (S3). Data transmission is performed with a conventional interface (for example, through a network or with a parallel system such as the Centronics).

(2) When the printer 2 receives data as shown in FIGS. 6 and 8, the header portion of the data is used to determine whether printing is with or without advertisements (S10). In the case of printing with advertisements, the user ID (UID) is extracted from the header portion (S11). The printer device 2 comprises a function for sending and receiving data with http/1.1 based on RFC2068. FORM data are generated with the UID information extracted from the data portion, and the data are sent to the server 4 for managing user data (S12). The server 4 performs prescribed procedures and receives the HTML data including the advertisement image data information that was sent (S13).

Advertisement image data information is extracted, the server is accessed again, and the advertisement image data are received (S14). The advertisement image data received are encrypted at the data transmission stage and are decrypted by the printer device 2. When appropriately authenticated, these are combined with the print data that are reduced to generate blank spaces and the actual print data are generated (S15). The data are then printed with advertisements as shown in FIG. 10 by the engine 21 of the printer 2. FIG. 10 (A) shows print output without advertisements and FIG. 10 (B) shows print output with advertisements. The printing with advertisements is an example wherein the text area is uniformly reduced, blank space for inserting advertisements is generated, and advertisement images are inserted.

(3) As shown in FIGS. 6 and 9, the server 4 uses an http server. The server receives FORM data sent by http from the printer 2 and extracts the user ID (UID) from the FORM data (S20). Based on the extracted UID, the server accesses the user management database 6 and updates the user table 10 and the reference count table 12 with the methods discussed above (S21). The server extracts the image data title, automatically generates HTML data including the image data name with a program, and sends this to the printer (S22). As shown in FIG. 8, the printer 2 takes the advertisement image file name from this HTML data and requests the advertisement image file from the server 4 (S23). An added code portion for certifying the validity of the image is attached to the advertisement image data requested. The code portion is encrypted using a known encryption technology such as PGP or S/MIME. The encrypted image data are sent to the printer 2 (S24).

Moreover, the image data may be directly encoded into text format such as MIME format in the HTML data generating portion (S22) and transmitted at one time. Also, the same action may be achieved using XML format or SGML format instead of HTML format.

FIG. 11 shows the flow of processing by this system. Printing with advertisements, accumulation of user points, and accumulation of the number of references are performed in this way.

(Discount usage phase)

Figure 12:
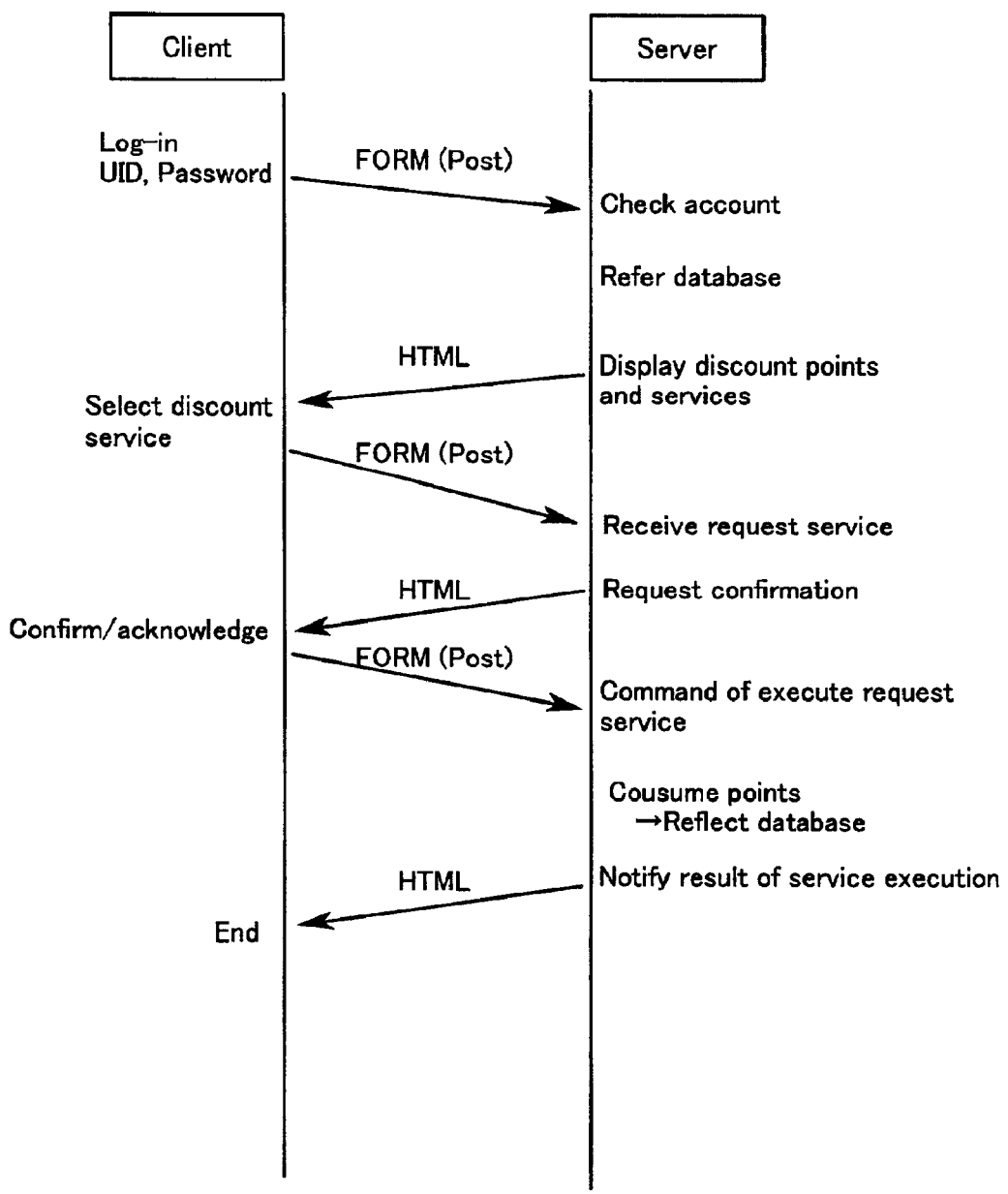
FIG. 12 is a drawing to explain the sequence of the discount usage phase in FIG. 1.
Figure 13A:
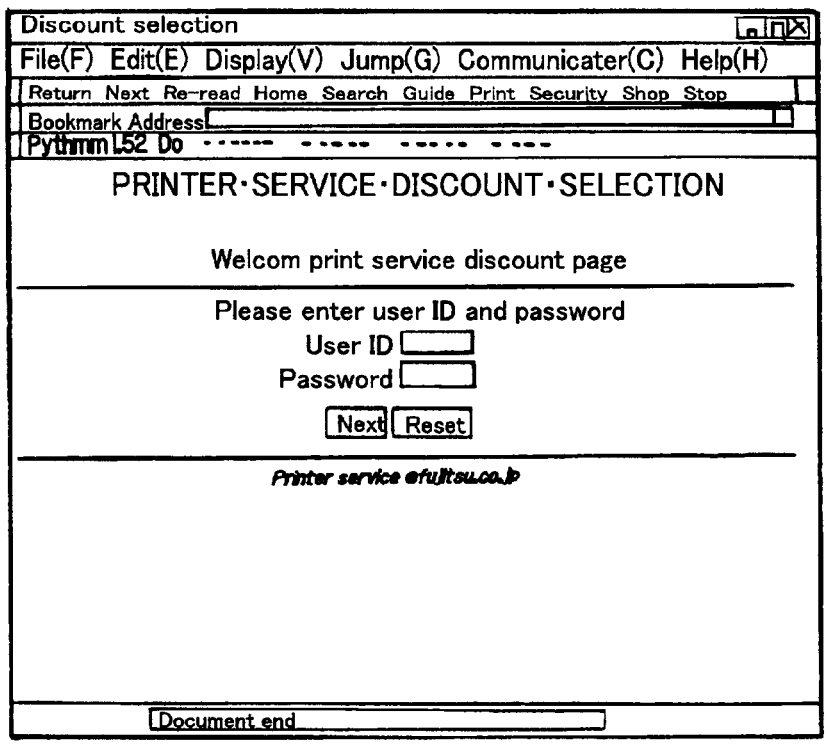
FIGS. 13(A), 13(B) and 13(C) are drawings to explain the display screen for the client in the discount usage phase in FIG. 12.
Figure 13B:
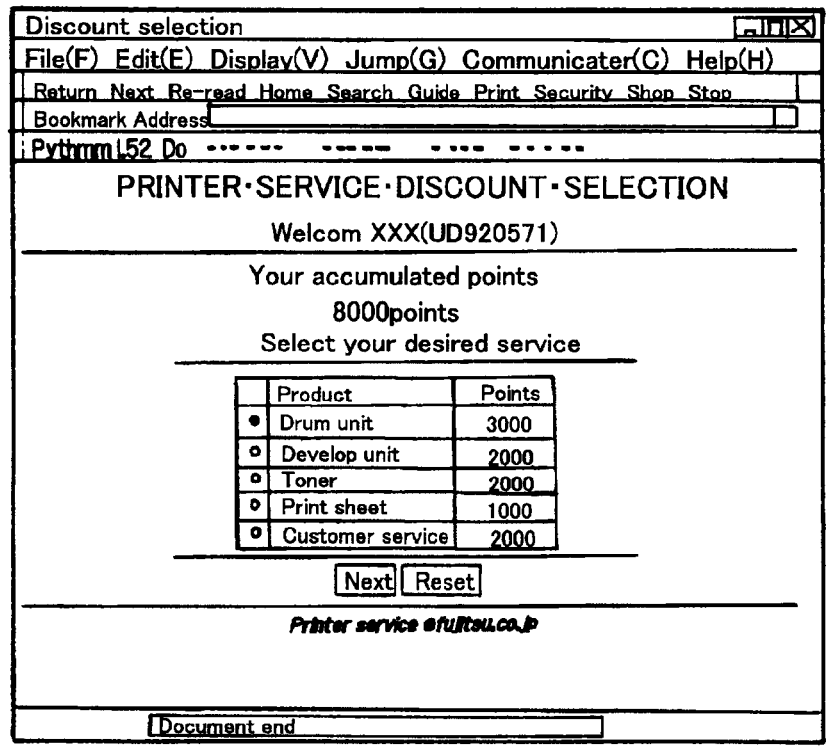
Figure 13C:
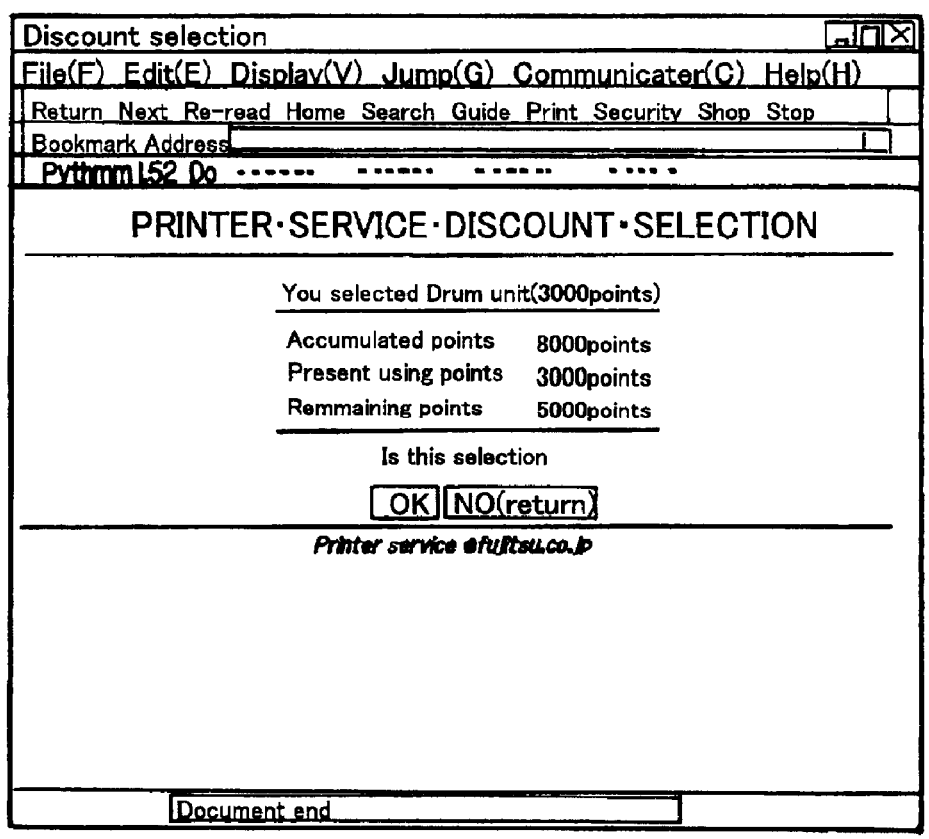
Figure 14:
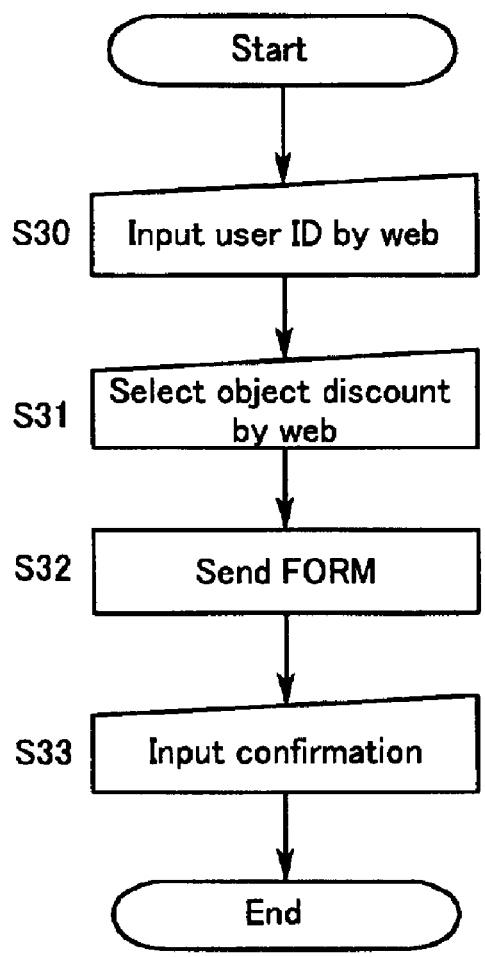
FIG. 14 is a flowchart of the processing by the client in the discount usage phase in FIG. 12.
Figure 15:
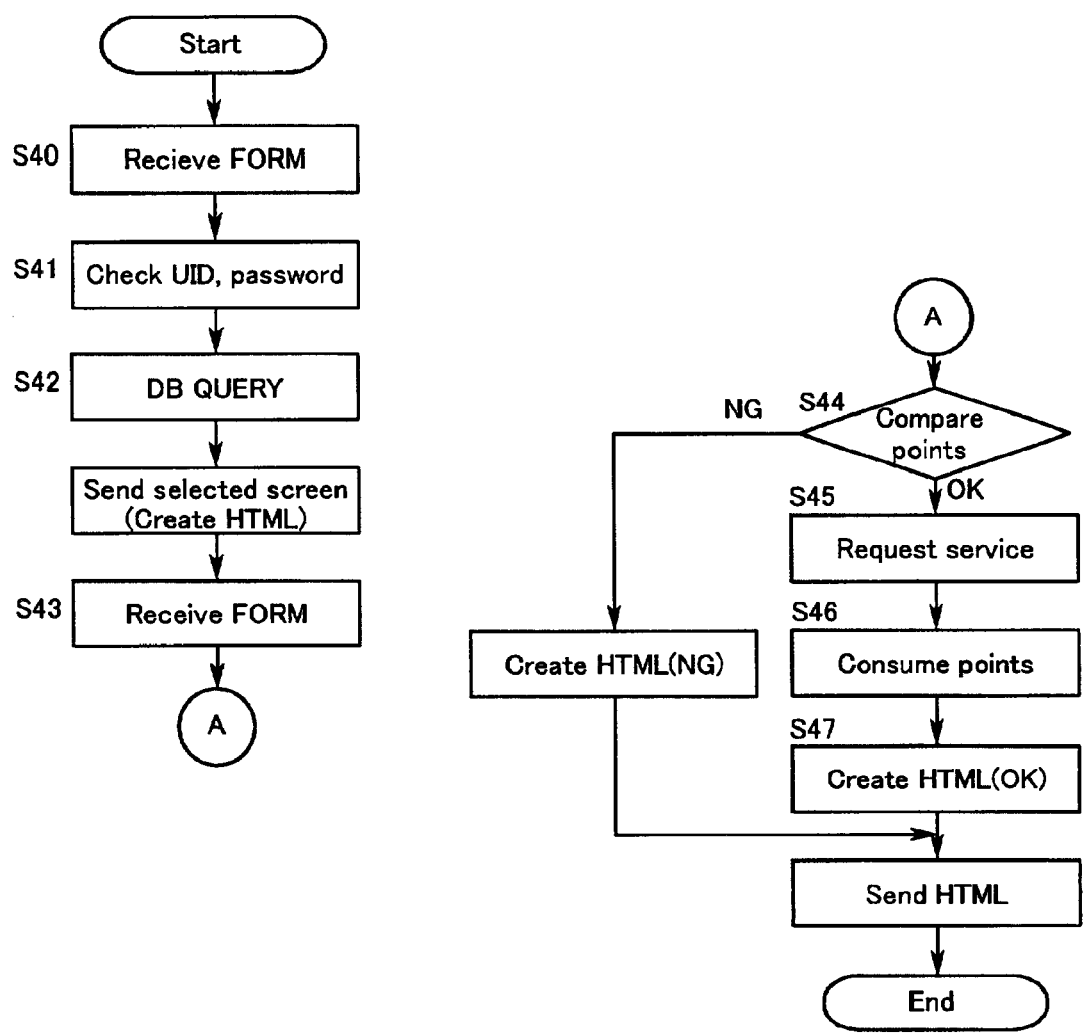
FIG. 15 is a flowchart of the processing by the server in the discount usage phase in FIG. 12.
Figure 16:
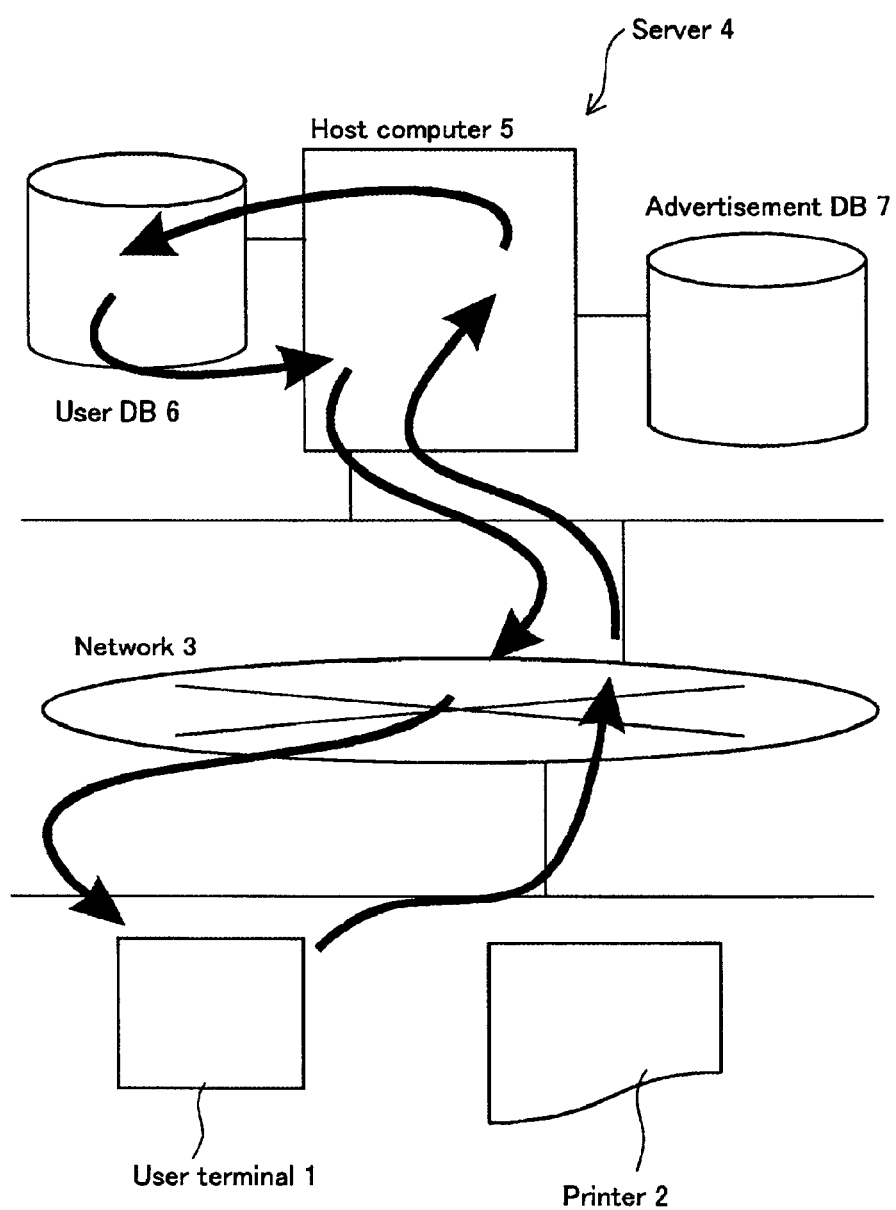
FIG. 16 is a drawing to explain the flow of the processing in the discount usage phase in FIG. 12.

The discount usage phase is explained next using FIGS. 12 through 16. FIG. 12 is a drawing to explain the flow of processing by the system when the discount is applied; FIG. 13 is a drawing to explain the discount request screen on the user terminal 1; FIG. 14 is a flowchart showing the processing of the client (user terminal) 1; FIG. 15 is a flowchart of the processing by the server 4; and FIG. 16 is a drawing to explain the discount usage phase.

In FIG. 12, the flow, in the case of the user requesting a discount, uses the server client system using the World Wide Web (WWW). Data communication during a discount request uses a known encryption system and therefore the contents of the data remain secure. In this case, the communication layer is encrypted using the SSL (secure sockets layer) system, a known technology. It is also possible to use other encryption systems, such as SHTTP (secure hypertext transfer protocol). The SSL-compatible WWW server may be a general commercial product, with which data encryption is possible, such as Netscape's Netscape Enterprise Server, Microsoft IIS, and Fujitsu Interstage. Also, the client 1 may be an SSL-compatible client, such as Microsoft Internet Explorer 4.0 or Netscape Communicator 4.0.

First, client processing is explained using FIGS. 12, 13, and 14. The user ID is input and the password is input as necessary (S30 and FIG. 13 (A)). After authentication is successfully completed, the service selection screen is displayed (FIG. 13 (B)). The user selects the desired service and presses the "OK" button (S31). After the FORM data are sent (S32), the verification screen is displayed (FIG. 13 (C)). When the verification is input, the service is actually ordered (S33).

Next, the server operations during a discount request are explained using FIGS. 12 and 15. The FORM data which are input the user ID and password are received from the client (S40). Next, an authentication check is performed with the user ID (UID) and password (S41). When authentication is successful, the server accesses the database 7 and searches for and acquires the cumulative points for that user from the user data table 10. The server generates the HTML and transmits this to the client along with a valid service selection screen (S42). The server receives FORM data including the service selected by the client (S43).

Next, the server compares the service details and the points and determines whether that service can be used (S44). When the service can be used, the server requests the provision of a service from the service provider (S45). The request includes the selected service details and customer information obtained from the user database and is made using a known method such as electronic mail or with an order form. When a service request is made, the accumulated points for the pertinent user in the user data table 10 are reduced by just the points used for this service and the database 10 is updated (S46).

Finally, the reception of the service and the details of the service are sent to the client as HTML data and the process is complete (S47).

FIG. 16 shows the flow of processing by this system. Service requests, consumption of user points, and performance of user services are carried out in this way.

Figure 17:
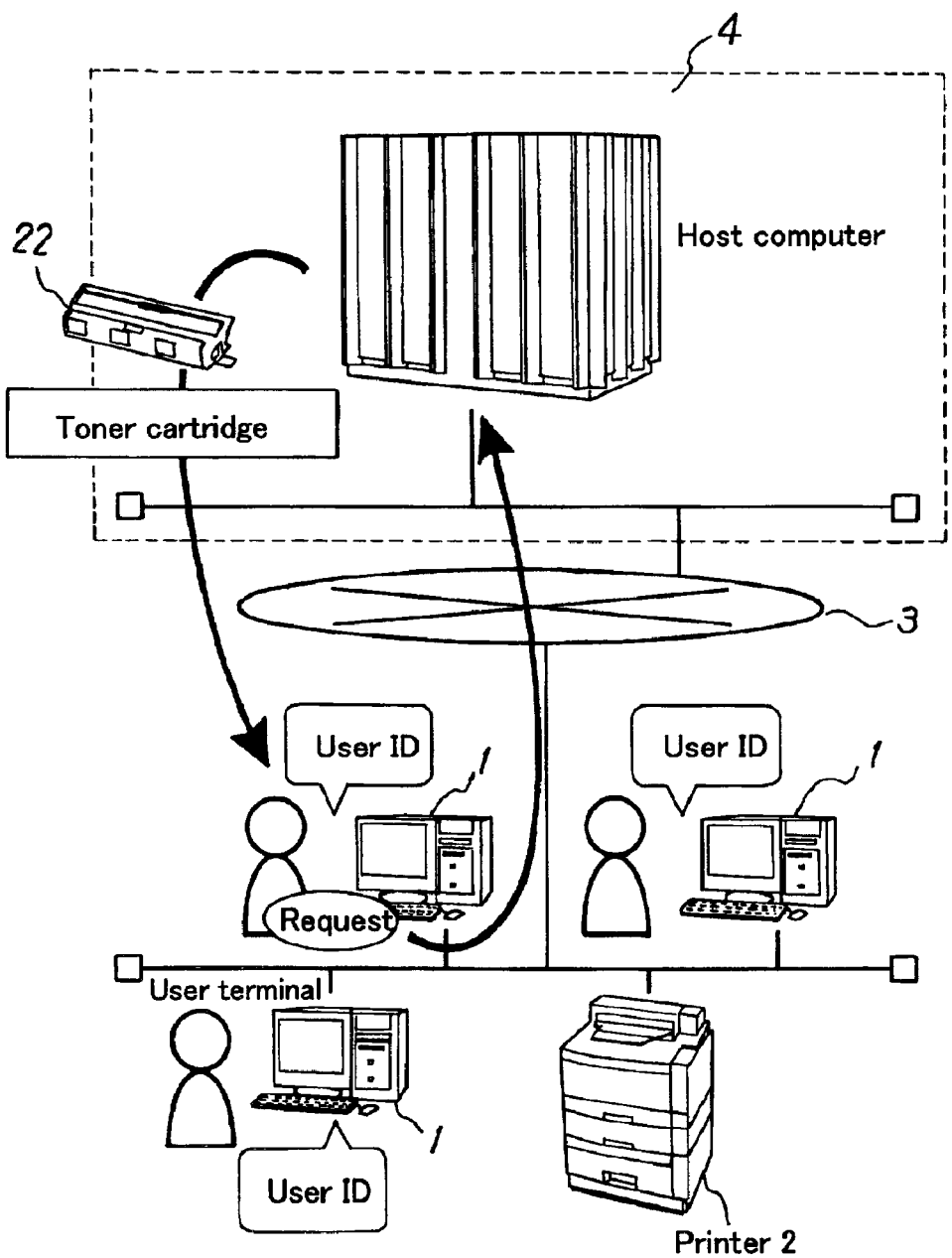
FIG. 17 is a drawing (the first) to explain the operations in the discount usage phase in FIG. 12.

FIG. 17 shows the flow in the case where a request is made for a toner cartridge 22 for the printer 2. The user makes a request for the toner cartridge 22 from the terminal 1 to the host 4. On the host side 4, the toner cartridge 22 is discounted by reference to the discount points with the user ID and a toner cartridge 22 is sent to the user.

Figure 18:
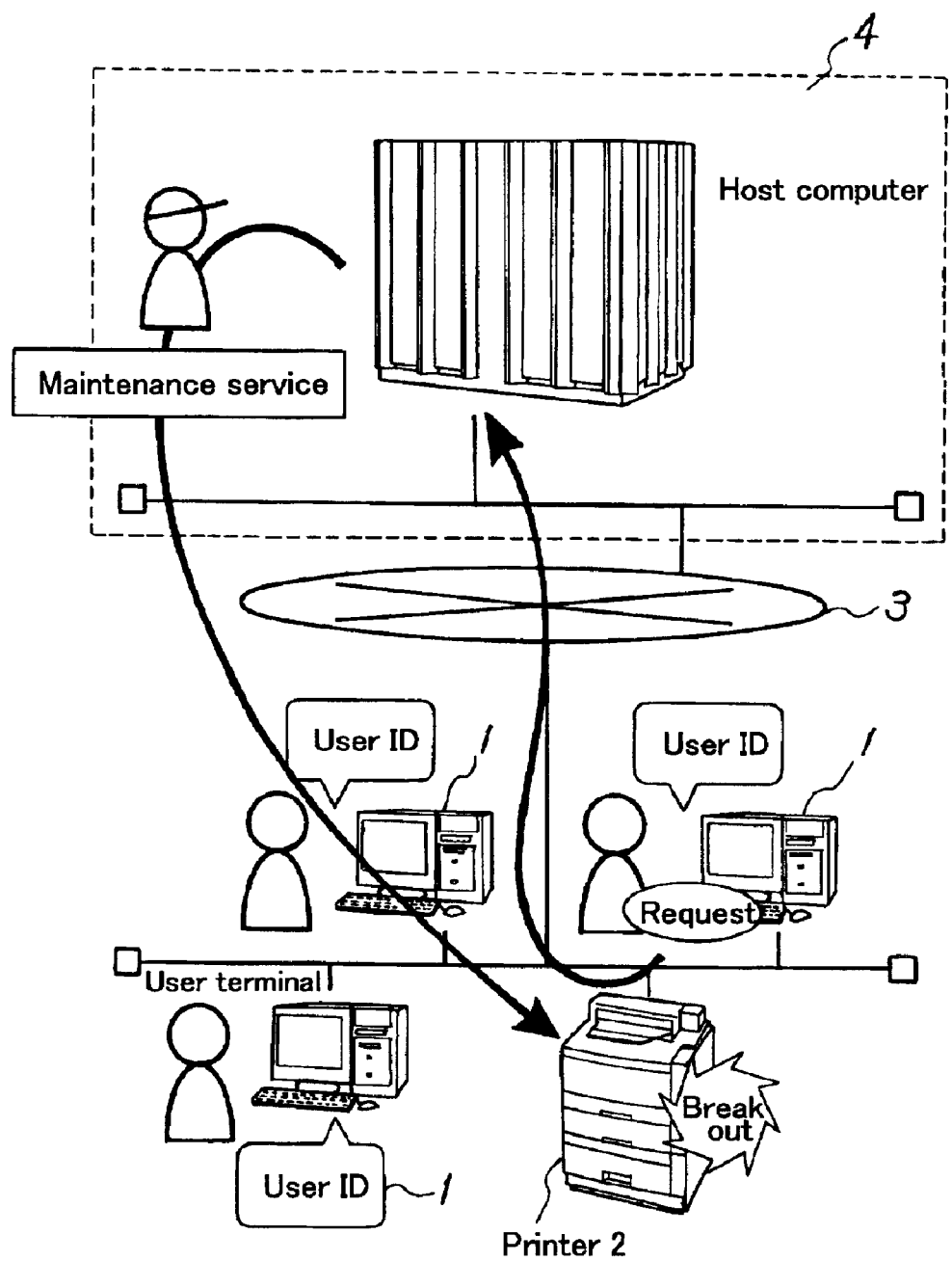
FIG. 18 is a drawing (the second) to explain the operations in the discount usage phase in FIG. 12.

FIG. 18 shows the flow in the case where a request is made for maintenance service when the printer 2 breaks down. The user makes a request for maintenance service from the terminal 1 to the host 4. On the host side 4, the maintenance service fees are discounted by reference to the discount points with the user ID, maintenance staff is dispatched to the user, and printer maintenance is performed.

Figure 19:
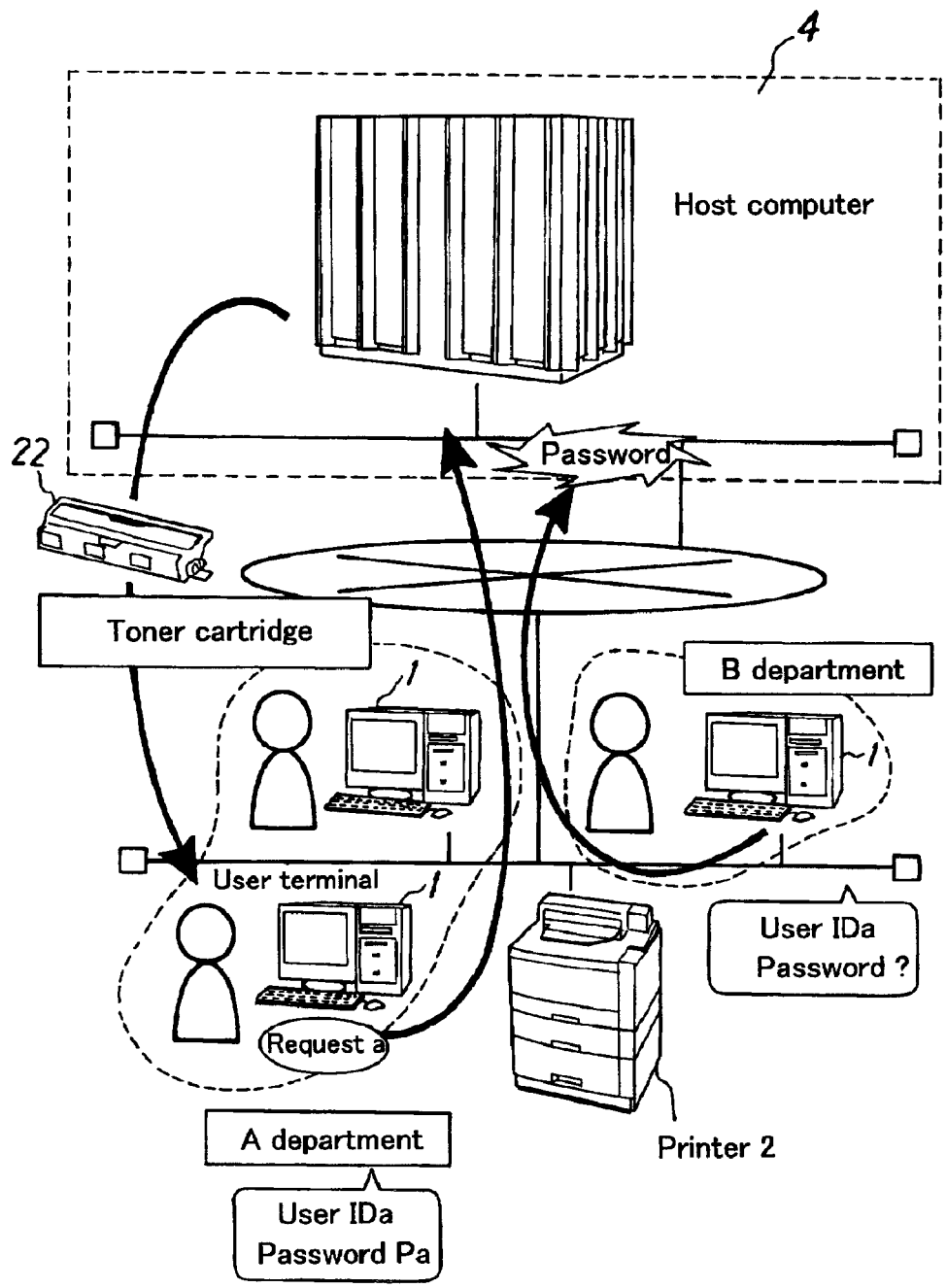
FIG. 19 is a drawing (the third) to explain the operations in the discount usage phase in FIG. 12.

FIG. 19 shows the flow in the case where Department A of the P Business Division makes a request for a toner cartridge 22 for the printer 2 in Department A. A user in Department A makes a request for a toner cartridge 22 from the terminal 1 to the host 4 using the user ID and password. On the host side 4, the password is authenticated, the toner cartridge 22 is discounted by reference to the discount points with the user ID, and the toner cartridge 22 is sent to the user (Department A). Even though Department B has the same user ID, Department B cannot use Department A's accumulated points to obtain a discount because Department B does not know the password.

Figure 20:
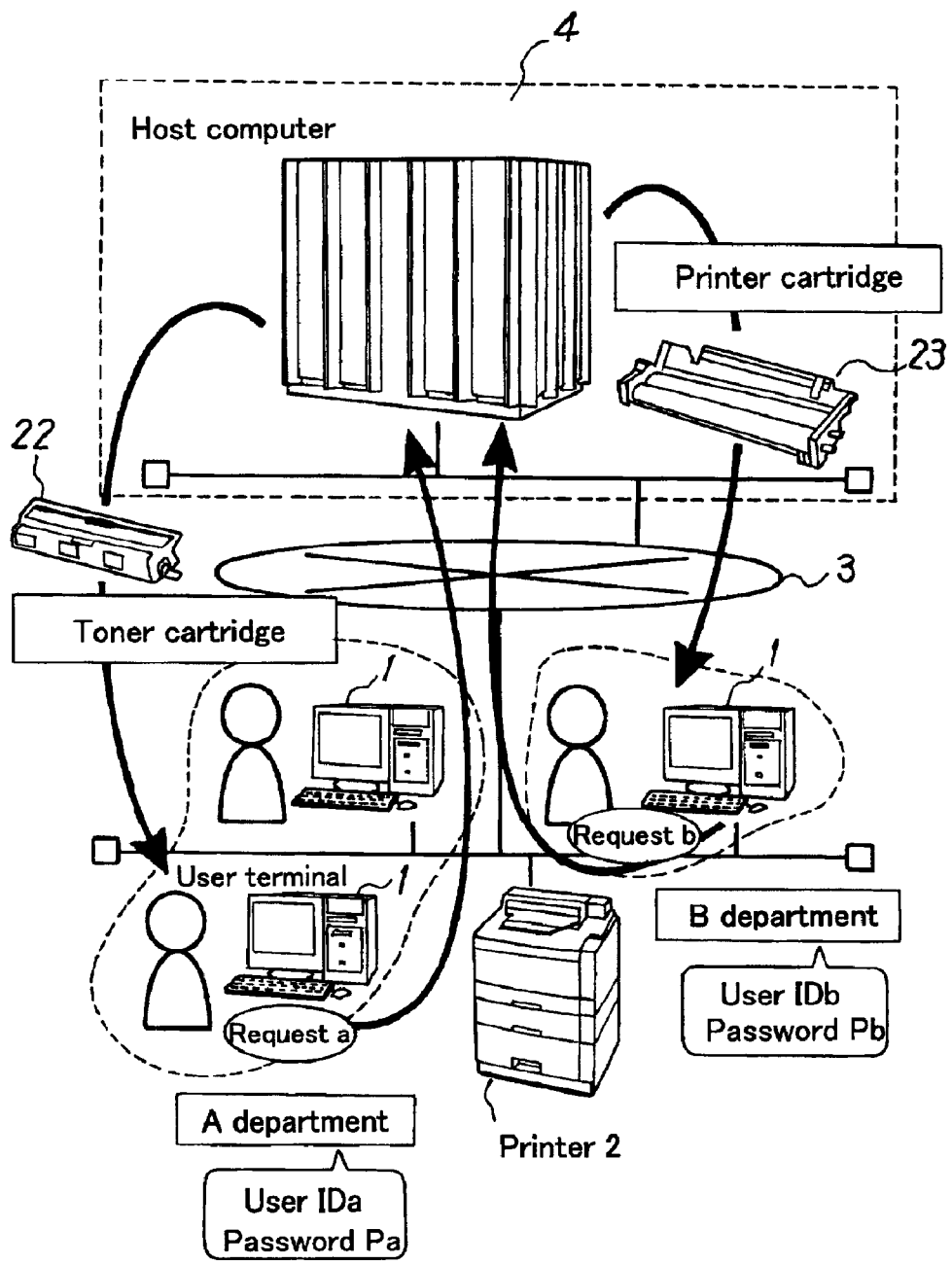
FIG. 20 is a drawing (the fourth) to explain the operations in the discount usage phase in FIG. 12.

As shown in FIG. 20, Department B can obtain a discount with Department B's accumulated points using the password for Department B. For example, the printer cartridge 23 for the printer 2 in Department B is discounted and the printer cartridge 23 is sent to the user (Department B).

In this way, this service is not a conventional method for discounting copying fees for individuals. Instead, the principal users are intended to be corporate users and this service is appropriate for company wide deployment by companies receiving conventional maintenance services. This service may be introduced company wide and a method of uniformly discounting service fees may be adopted, and has benefits of scale. Also, by establishing passwords such as those in the embodiments in FIGS. 19 and 20, it is also possible for only a certain division to make a contract and introduce this service as means for limiting costs within the division. FIG. 20 shows an example wherein separate IDs and passwords are established for different divisions.

Also, the service provider may be a single company, but it is also possible for a plurality of companies to provide the services within a single corporation. User convenience is further improved by introducing an element of competition.

Furthermore, with this system, it is possible to provide a high level of service to the user such as maintenance services and cartridge retail price services, in addition to discounts for printing fees.

(Other embodiments)

Figure 21:
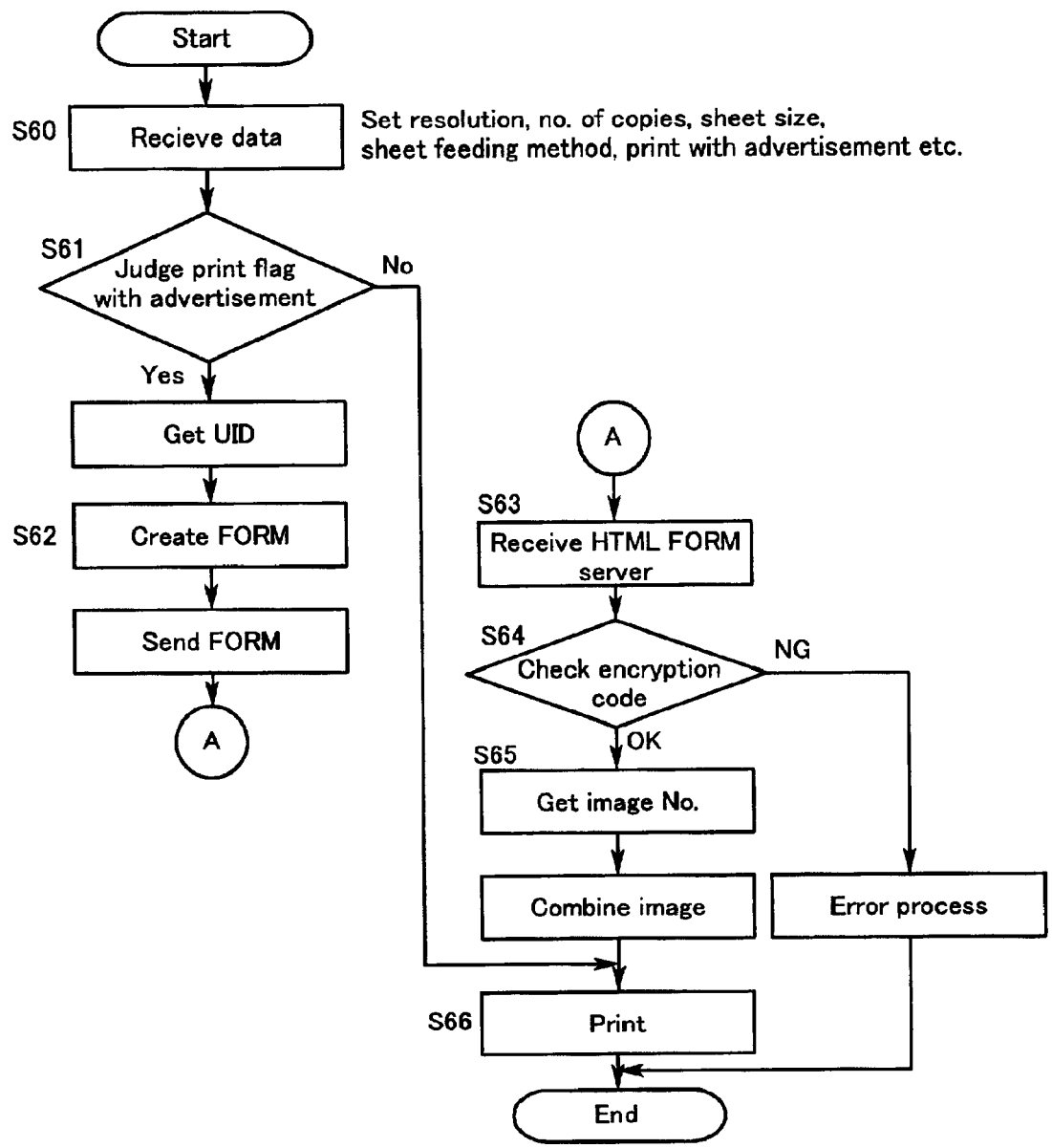
FIG. 21 is a flowchart of the processing by the printer in another embodiment of the present invention.
Figure 22:
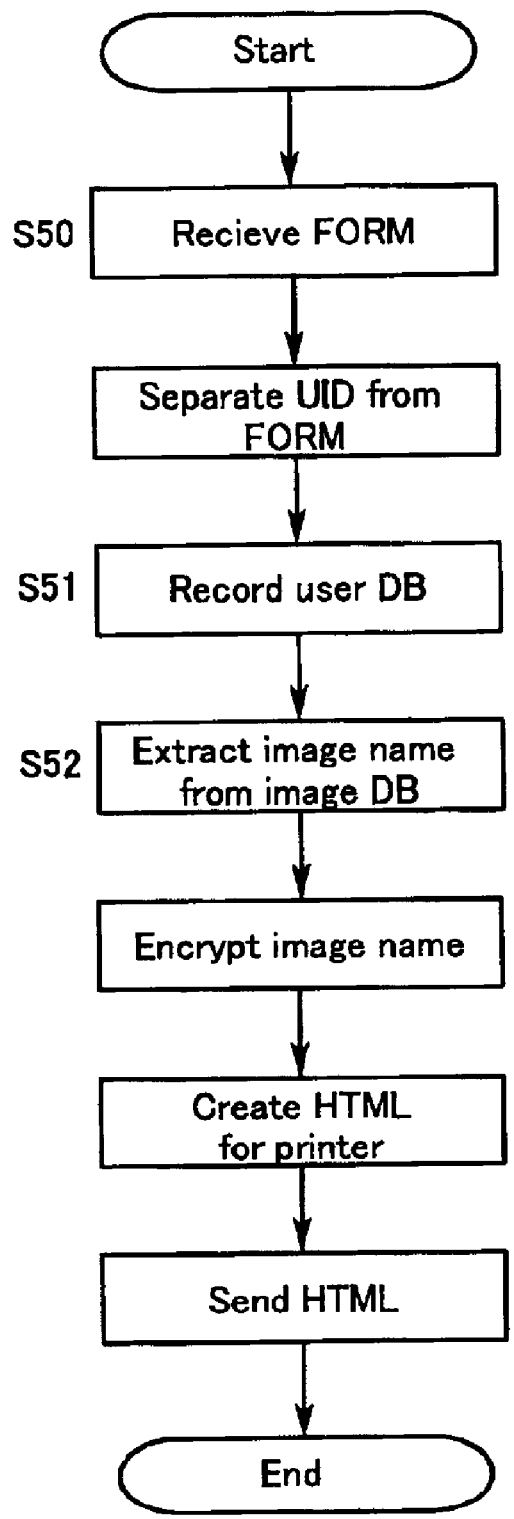
FIG. 22 is a flowchart of the processing by the server in another embodiment of the present invention.

FIGS. 21 and 22 show examples of other embodiments for printing with advertisements. FIG. 21 is a flowchart of the processing on the client side 1 and FIG. 22 is a flowchart of the processing on the server side 4. In the cases of these embodiments, the advertisement images are held in a storage device such as a hard disk for storing images that is established on the printer side 2.

When there is a request for printing with advertisements, only the image data name is sent from the server side. In other words, as shown in FIG. 22, the server 4 receives the FORM data by http from the printer 2 and extracts the user ID (UID) from within the FORM data (S50). According to the UID acquired, the server accesses the user management database 6 and updates the user table 10 and reference count table 12 using the method discussed above (S51). After the image data name is extracted and encrypted, HTML data including the image data name are automatically generated with a program and sent to the printer 2 (S52).

The printer 2 then pulls the advertisement image, corresponding to the image data name sent from the server 4, from the internal hard disk for storing images and inserts the image into the print data. It thereby becomes unnecessary to transfer high-capacity image data, and the throughput until completion of the printing is vastly improved.

In other words, as shown in FIG. 21, when the printer 2 receives data, the printer determines whether to perform printing with or without advertisements from the header portion of the data (S60). In the case of printing with advertisements, the printer extracts the user ID (UID) from the header portion (S61). The printer sends the UID information extracted from the data portion as FORM data to the server 4 for managing user data (S62). The server 4 carries out prescribed procedures and receives HTML data including the advertisement image name that was sent (S63). The advertisement image name received is encrypted at the data transmission stage and is decrypted by the printer device 2. When appropriately authenticated, the advertisement image corresponding to the image data name is extracted from the internal hard disk for storing images and inserted in the print data, whereby the actual print data (is generated (S65). The print data is then printed with the advertisements by the engine 21 of the printer 2 as shown in FIG. 10 (S66).

The advertisement image data stored in the printer 2 are periodically downloaded through the network by http at fixed intervals or at times of low network traffic such as nighttime or early morning, and the latest advertisement images are continually stored in the printer.

Also, users can be denominated in a variety of ways as follows. In other words, the users can be in units of individuals (establish an ID for an individual), in groups (establish a group ID), grouped by device (establish a device ID), or grouped by company (establish a company ID).

Furthermore, this explanation concerned a printer 2 that is an output device for personal computers, but the present invention can also be used for image forming devices such as photocopiers and multiple purpose printing machines.

The present invention was explained above using embodiments. However, the present invention can be modified in various ways within the scope of the present invention and these embodiments do not fall outside the technical scope of the present invention.

(1) In the case of printing with advertisements using a conventional copying device or a printer having a function for generating and printing advertisements, a predetermined company ID or user ID are assigned. And printing management information, such as the number of pages printed with advertisements or the area, is sent to a host computer along with the ID when printing with advertisements and is stored as points. Furthermore, based on the ID, a user is able to obtain actual discounts by sending an inquiry and a request to the host computer from the user terminal. For this reason, the products that are subject to discounts can be selected from among a plurality of services as well as discounts to printing charges.

(2) Normally, the images used on the WWW are generated at a resolution based on the 72 to 75 dpi that is the resolution of a computer display. For this reason, when WWW images are printed without further processing, this results in a printed image that is very difficult to view. In the case of advertisements to be printed, however, it becomes possible to provide attractive, fine print advertisements, that are also highly informative because it is possible to print monochrome images at 600 dpi, a printer's resolution, or to print full-color images; these advertisements are very effective.

(3) Also, paper printing has an advantage in that information is easy to read and can be read at any time, unlike information that is displayed on a computer display. This therefore proves to be economically advantageous because advertising fees to the advertiser can also be established at higher levels than fees for network use.

(4) This service is not a conventional method for discounting copying fees for individuals. Instead, the principal users are intended to be corporate users and this service is appropriate for company wide deployment by companies receiving conventional maintenance services. This service may be introduced company wide and a method of uniformly discounting service fees may be adopted, and has benefits of scale. Also, by establishing passwords, it is also possible for only a certain division to make a contract and introduce this service as means for limiting costs within the division.

(5) Also, the service provider may be a single company, but it is also possible for a plurality of companies to provide the services within a single corporation. User convenience is further improved by introducing an element of competition.

What is claimed is:

1. A printing service method comprising:

a printing step for transferring printing management information and a user ID to a server through a network when a user prints with advertisements with the user's printing device, and for storing that information as an advertisement usage record for each user ID;

a step for referencing said user's advertisement usage record for at least one service, selected by said user from among a plurality of services relating to said printing device that used said advertisement usage record, and determining whether discounting of the selected service is authorized; and a step of updating said user's advertisement usage record to execute said authorized discount service.

2. The printing service method according to claim 1, wherein said printing step comprises:

a step of sending said printing management information to said server from said printing device;

a step of calculating said user's advertisement usage record from said printing management information, compiling the advertisement usage record, and transferring the advertisement information to said printing device; and a step of combining print data with an advertisement image on the basis of the advertisement information from said server, and printing said image to be printed by said printing device.

3. The printing service method according to claim 2, wherein said sending step comprises:

a step for receiving said printing management information and printing information from the user terminal using said printing device; and a step for spooling said printing information and sending said printing management information to said server.

4. The printing service method according to claim 2, wherein said transferring step comprises a step for transferring the advertisement image to said printing device.

5. The printing service method according to claim 2, wherein said transferring step comprises a step for transferring the advertisement image name to said printing device; and wherein said printing out step comprises a step for selecting the advertisement image with said advertisement image name from among a plurality of advertisement images compiled in said printing device.

6. The printing service method according to claim 1, wherein said updating step comprises a step for authenticating the password input by said user.

7. The printing service method according to claim 2, wherein said step for transferring advertisement information comprises a step for calculating the frequency of use of said advertisement image from the printing management information of said user, and calculating said advertisement usage record.

8. The printing service method according to claim 2, wherein said step for transferring advertisement information comprises a step for selecting at least one item of advertisement information from among a plurality of items of advertisement information stored in said server.

9. The printing service method according to claim 7, wherein said step f or calculating the advertisement usage record comprises a step for minimally calculating the number of pages of printing with advertisements.

10. The printing service method according to claim 1, wherein said printing step comprises a step for updating the number of references to said advertisement.

11. The printing service method according to claim 10, further comprising a step for calculating the advertisement costs billed to the advertiser from the number of references to said advertisement.

12. A printing service system comprising:

an advertisement usage database; and a server for receiving printing management information and a user ID through a network when the user prints with advertisements with a printing device, and storing that information as an advertisement usage record for each user ID in said advertisement usage database;

wherein said server references the user's advertisement usage record in said advertisement database, for at least one service, selected by said user from among a plurality of services relating to said printing device that used said advertisement usage record, determines whether discounting of the selected service is authorized, and updates said user's advertisement usage record to execute said authorized discount service.

13. The printing service system according to claim 12, wherein further comprising said printing device for sending said printing management information to said server, combining print data with an advertisement image on the basis of the advertisement information from said server, and printing said image to be printed.

14. The printing service system according to claim 13, wherein said printing device receives said printing management information and printing information from the user terminal using said printing device, spools said printing information and sends said printing management information to said server.

15. The printing service system according to claim 12, wherein said server transfers the advertisement image to said printing device.

16. The printing service system according to claim 12, wherein said server transfers the advertisement image name to said printing device; and wherein said printing device selects the advertisement image with said advertisement image name from among a plurality of advertisement images compiled in said printing device.

17. The printing service system according to claim 12, wherein said server authenticates the password input by said user.

18. A printer comprising:

a control unit for sending printing management information from a user terminal along with a user ID through a network to a server for managing advertisement information, and generating image data including said advertisement image combined with the printing information to be printed, on the basis of advertisement information received from said server; and an engine connected to said control unit and for printing out said image data.

* * * * *

UNITED STATES PATENT AND TRADEMARK OFFICE
CERTIFICATE OF CORRECTION

PATENT NO. : 6,882,439 B2
DATED : April 19, 2005
INVENTOR(S) : Hiroyasu Ishijima It is certified that error appears in the above-identified patent and that said Letters Patent is hereby corrected as shown below:

Column 13,
Line 46, change "f or" to -- for --.

Signed and Sealed this

Third Day of January, 2006

JON W. DUDAS
*Director of the United States Patent and Trademark Office*